March 2, 1954  J. B. HORD  2,670,475
HOSE ATTACHMENT
Filed March 16, 1949
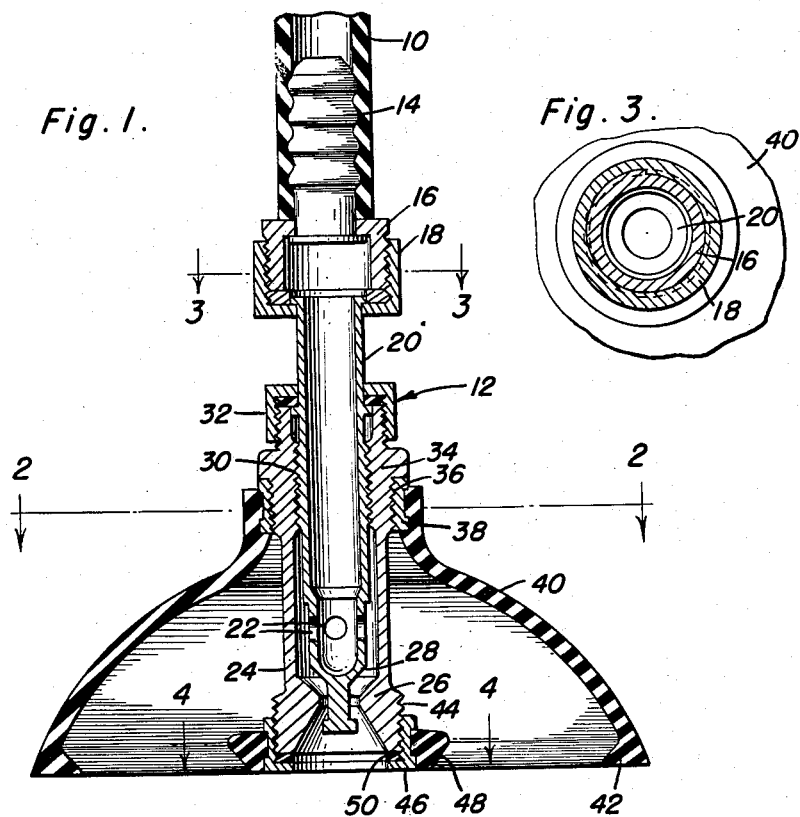
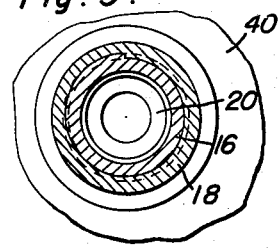
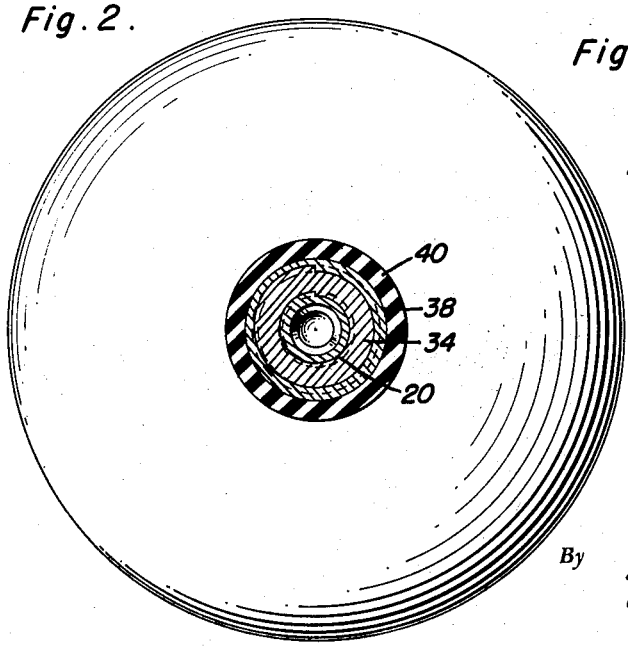
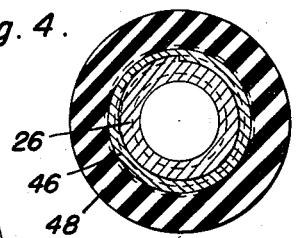
Inventor
Joseph B. Hord
By *Clarence A. O'Brien and Harvey B. Jacobson*
Attorneys Patented Mar. 2, 1954

2,670,475

UNITED STATES PATENT OFFICE 2,670,475

HOSE ATTACHMENT

Joseph B. Hord, Maxton, N. C.

Application March 16, 1949, Serial No. 81,682

1 Claim. (Cl. 4—256)

This invention relates generally to hose attachments, and more particularly to hose attachments which will be mounted upon a spray nozzle such as is commonly used in connection with equipment used for spraying lawns and the like.

A primary object of this invention is to provide the means for temporarily connecting a hose with drain pipes with a view to clearing obstructions therefrom, as, for example, connection of a hose to the drain pipe of a sink, lavatory, or bath tub.

Another object of this invention, closely related to the preceding object, is to provide means for connection of a hose to a pipe terminating in an apertured plate, the enviroment concerned in sinks, lavatories, and bath tubs, the means including structure to contact the plate as well as means acting as an apertured plug insertable in the end of the pipe.

Still another object of this invention is to provide means incorporating the features mentioned in the immediately preceding object, the means for engaging the plate and pipe both being flexible and the outer member thereof comprising a cup-shaped adapter dimensioned so that a chamber is defined between this outer adapter member and the inner member which may also be considered as an adapter, whereby the operator can produce a pulsating irregular flow of water into a blocked pipe.

Still another object of this invention is to combine a spray nozzle with flexible adapters so that the adapters comprise means to protect the spray nozzle from damage, thus allowing the spray nozzle to be constructed of non-metallic material.

And a last object to be mentioned specifically is to provide a device of this character which is relatively inexpensive and practicable to manufacture, which is simple, safe and convenient to operate, and which will give generaly efficient and durable service.

With these objects definitely in view, this invention resides in certain novel features of construction, combination and arrangements of elements and portions as will be hereinafter described in detail in the specification, particularly pointed out in the appended claim and illustrated in the accompanying drawings which form a material part of this specification, and in which:

Figure 1 is a vertical sectional view showing the end of a hose with this invention secured thereon;

Figure 2 is a horizontal section taken substantially upon the line 2—2 in Figure 1; and Figures 3 and 4 are horizontal sections taken on the respective section lines in Figure 1.

Similar characters of reference designate similar or identical elements and portions throughout the specification and throughout the different views in the drawing.

Refering now to the drawing in detail, the environment whereupon this invention is adapted to be used will include a hose 10, fragmentarily shown in Figure 1, and a spray nozzle, generally indicated by the numeral 12, will be secured to the end of the hose 10 by means of a nipple 14 represented as having an undulating exterior and insertable into the end of the hose 10. The spray nozzle will also include a pair of cup-shaped threaded couplings 16 and 18 used to secure an inner tube 20 of the spray nozzle to the outer end of the nipple 14.

The inner tube 20 has a reduced portion with a plurality of water outlet apertures 22 whereby water from the hose 10 is allowed to enter the outer tube 24. This outer tube 24 has a valve seat 26 provided adjacent what may be considered its outer end and the inner tube 20 has a bevelled portion 28 which coacts with the valve seat 26 to vary the size of the outlet of the spray nozzle according to the longitudinal adjustment of the inner tube 20 within the outer tube 24, this adjustment being permitted by provision of threads 30 on intermediate portions of the said tubes. An internally threaded cap 32 with a suitable gasket may be provided on what may be considered the inner end of the outer tube 24, this cap being centrally apertured to receive the inner tube 20.

The central portion of the outer tube 24 may have an enlargement 34 externally threaded as at 36 to receive a removable bushing 38, and this bushing 38 carries the outer flexible collapsible adapter 40 which is of cup-shape and arranged coaxially of the spray nozzle. The outer adapter 40 will preferably have a reinforced rim portion 42 at its outer or open end. The outer end of the outer tube 24 will be provided with an enlarged and externally threaded portion 44 which is similar to the threaded portion 36 and which receives an internally threaded removable bushing 46, and this bushing 46 carries the internal flexible adapter 48. In this connection, it may be noted that a complement of gaskets, such as that indicated at 50, will be provided. It should also be noted that the outer rim portion 42 of the cup-shaped outer adapter 40 will be substantially co-planar with the inner flexible adapter 48. An open-sided chamber will be defined between the outer adapter 40 and the inner adapter 48 and the portions of the spray nozzle within the outer adapter. The bushing 38 is adapted to be threaded on and past the portion 44 for engagement with the threaded portion 36 of the tube 24.

The operation of this invention will be clearly understood from a consideration of the foregoing description of the mechanical details thereof, taken in connection with the drawing and with the above recitation of the objects sought to be achieved by his invention. When a steady or uniform water pressure is desired for opening a clogged drain pipe, the hose 10 is connected to a convenient faucet or cock, the adapter 48 is engaged in the pipe and the valved nozzle 12 is opened. When a pulsating action is desired, the adapter 48 is removed and the collapsible adapter 40 is substituted therefor on the threaded portion 44 of the nozzle 12. The adapter 40 is then brought into sealing engagement with the sink or tub bottom surrounding the drain pipe and alternately collapsed and opened in an obvious manner for producing the desired pulsating action. By closing the valved nozzle 12, the device may also be used without water pressure from an external source.

Minor variation from the embodiment described herein may be resorted to without departure from the spirit and scope of this invention, and this scope should be determined by the terms used in the subjoined claim.

Having described the invention, what is claimed as new is:

A hose attachement comprising an inner tubular valve member including an externally threaded intermediate portion and a sleeve including an externally and internally threaded intermediate portion threaded for longitudinal adjustment on said valve member, said sleeve further including a seat engageable by the valve member and still further including externally threaded end portions, a resilient male adapter engageable in a drain and comprising a metallic bushing threaded on one portion of the sleeve, a packing nut threaded on the other end portion of the sleeve, and a resilient, substantially cup-shaped adapter including a metallic bushing threaded on the intermediate portion of the sleeve and engageable with a surface surrounding the drain, the second-named bushing being screwable on and past said one end portion of the sleeve for threaded engagement with said intermediate portion of said sleeve.

JOSEPH B. HORD.

References Cited in the file of this patent

UNITED STATES PATENTS

| Number | Name | Date |
|---|---|---|
| 1,110,715 | Reese | Sept. 15, 1914 |
| 1,937,172 | Starner et al. | Nov. 28, 1933 |
| 2,016,158 | Vartanian | Oct. 1, 1935 |
| 2,039,792 | Harder | May 5, 1936 |
| 2,086,149 | Allen | July 6, 1937 |
| 2,188,960 | Schubring | Feb. 6, 1940 |